No. 615,994. Patented Dec. 13, 1898.
E. R. LEIGHTON.
COUCH BED.
(Application filed Sept. 17, 1897.)
(No Model.) 5 Sheets—Sheet 1.

WITNESSES:
C. C. Stecher
A. D. Harrison

INVENTOR:
Eugene R. Leighton
by Wright, Brown & Quinby
Attys

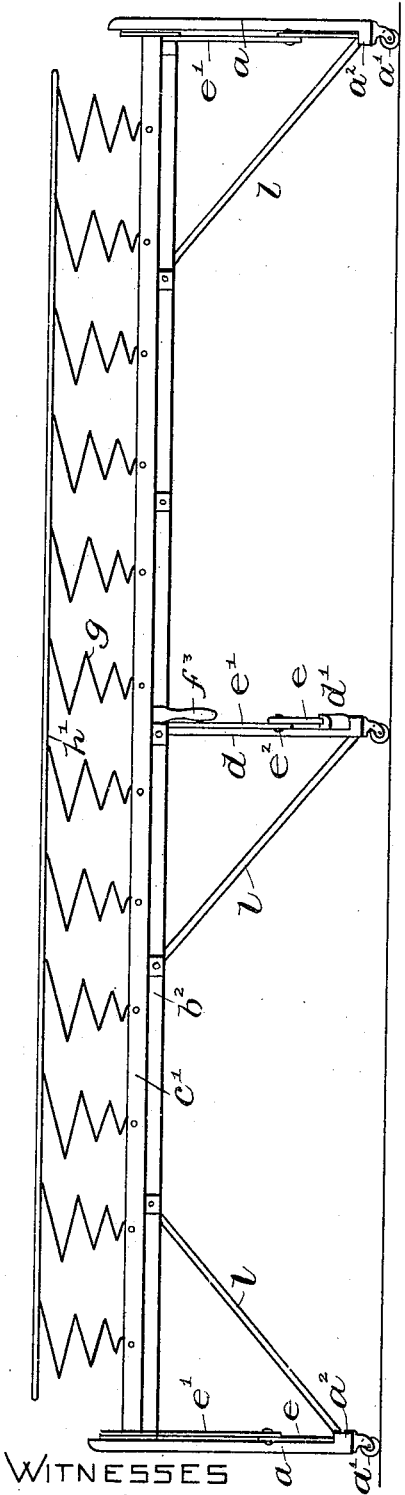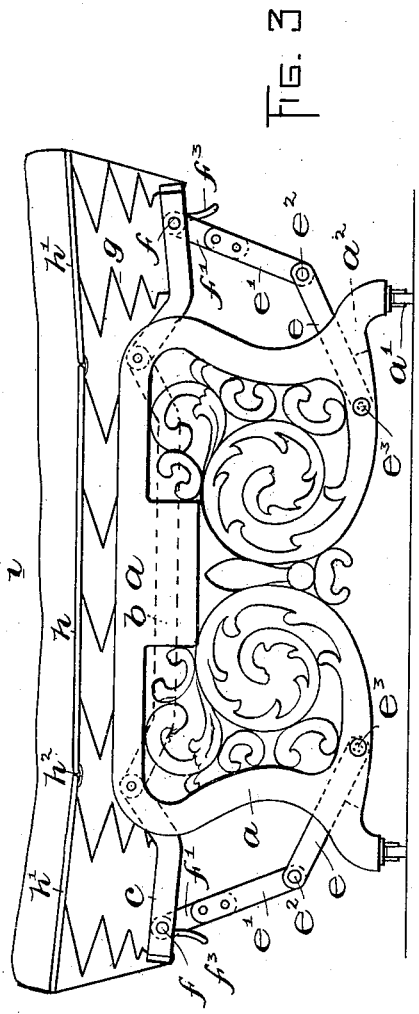

No. 615,994. Patented Dec. 13, 1898.
E. R. LEIGHTON.
COUCH BED.
(Application filed Sept. 17, 1897.)
(No Model.) 5 Sheets—Sheet 3.

WITNESSES:
C. C. Stecher
A. D. Harrison

INVENTOR:
Eugene R. Leighton
by Wright, Brown & Quinby
Attys.

No. 615,994. Patented Dec. 13, 1898.
E. R. LEIGHTON.
COUCH BED.
(Application filed Sept. 17, 1897.)

(No Model.) 5 Sheets—Sheet 4.

WITNESSES:
C. C. Stecher
A. D. Harrison

INVENTOR:
Eugene R. Leighton
by Wright, Brown & Quinby
Attys.

THE NORRIS PETERS CO., PHOTO-LITHO., WASHINGTON, D. C.

No. 615,994. Patented Dec. 13, 1898.
E. R. LEIGHTON.
COUCH BED.
(Application filed Sept. 17, 1897.)
(No Model.) 5 Sheets—Sheet 5.

WITNESSES:
C. C. Steeher
A. J. Harrison.

INVENTOR:
Eugene R. Leighton
by Wright, Brown & Quinby
Attys.

UNITED STATES PATENT OFFICE.

EUGENE R. LEIGHTON, OF BOSTON, MASSACHUSETTS.

COUCH-BED.

SPECIFICATION forming part of Letters Patent No. 615,994, dated December 13, 1898.

Application filed September 17, 1897. Serial No. 651,957. (No model.)

*To all whom it may concern:*

Be it known that I, EUGENE R. LEIGHTON, of Boston, in the county of Suffolk and State of Massachusetts, have invented certain new and useful Improvements in Couch-Beds, of which the following is a specification.

This invention has relation to that class of beds known as "couch-beds," which are constructed with swinging side frames, whereby they may be changed from a bed into a couch, or vice versa, by raising or lowering the said side frames.

The object of the present invention is to provide a metallic couch-bed in which the said side frames may be raised and lowered with the least possible exertion and without the use of lifting mechanism, in which the parts may be formed of relatively light material, and in which the mattress may be constructed of coiled springs and afford a yielding surface whether the side frames be elevated or lowered.

Other objects of the invention are to provide a couch-bed which is strong and durable, which is sightly and ornate in appearance, and which is constructed of comparatively cheap material, whereby it may be placed upon the market for the benefit of the public at a small cost to the purchaser.

To these ends the invention consists of a couch-bed possessing certain features of construction and arrangement, as fully illustrated upon the drawings and now to be described in detail and then pointed out in the claims hereto appended.

Reference is to be had to the accompanying drawings, and to the letters and figures marked thereon, forming a part of this specification, the same letters designating the same parts or features, as the case may be, wherever they occur.

Figure 1:
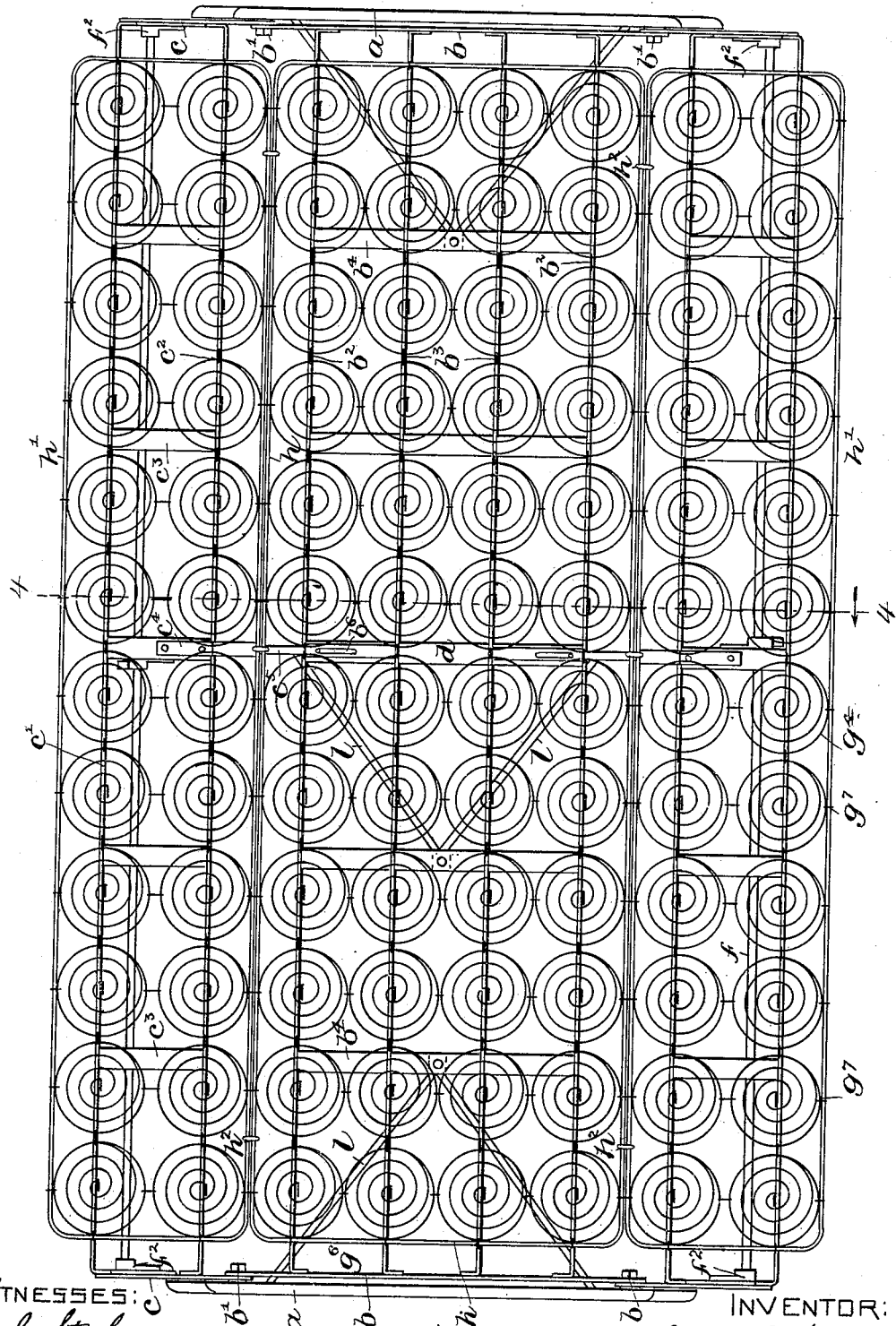
Figure 4:
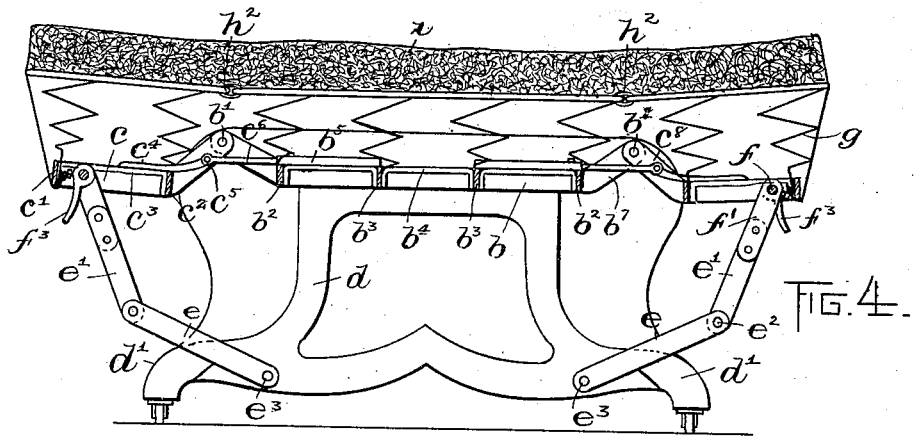
Figure 5:
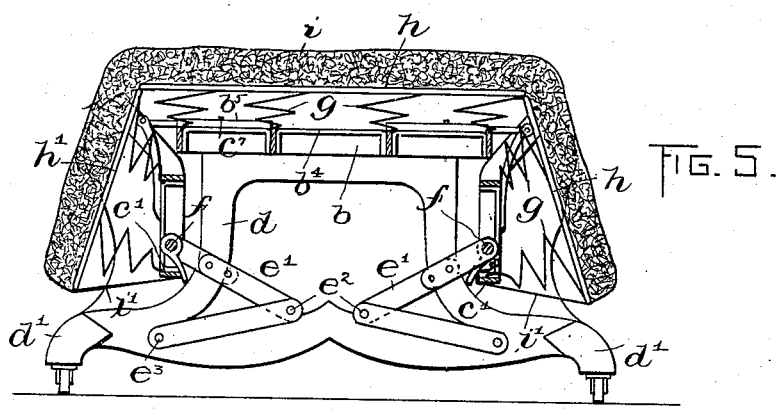
Figure 6:
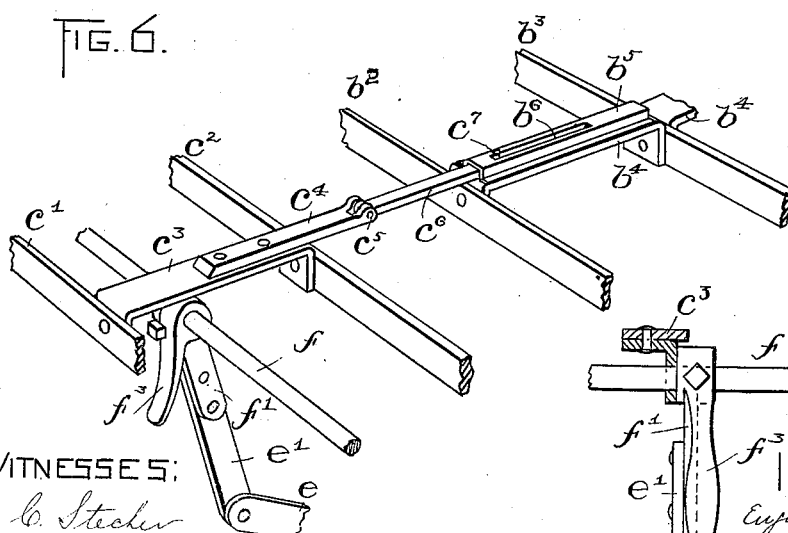
Figure 7:
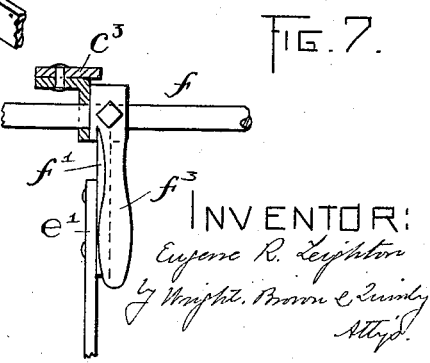
Figure 8:
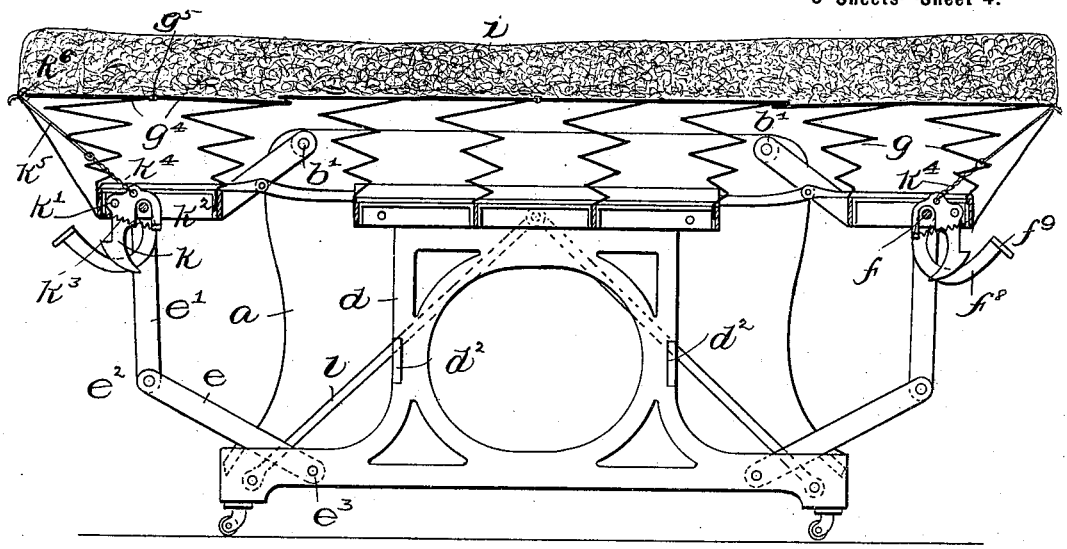
Figure 9:
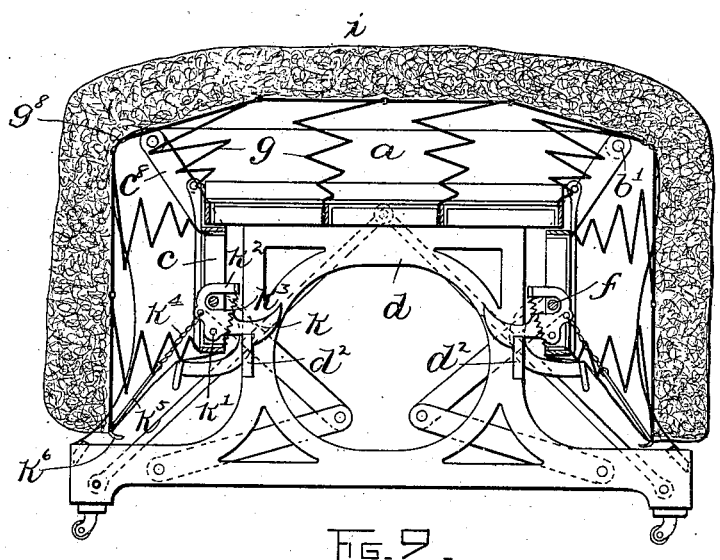
Figure 10:
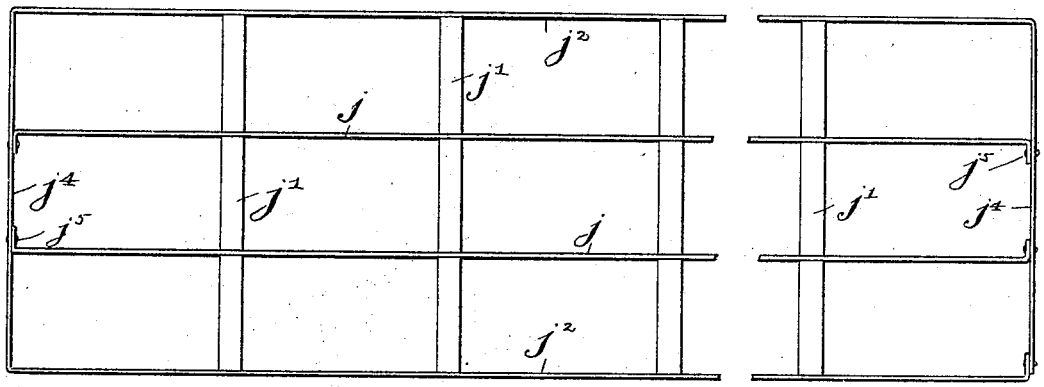
Figure 11:
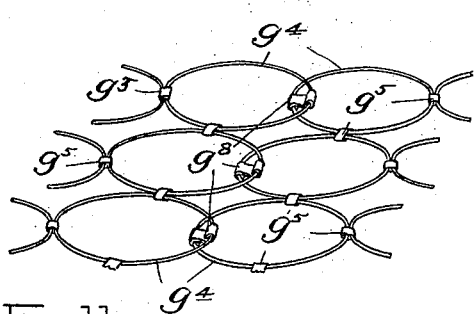
Figure 12:
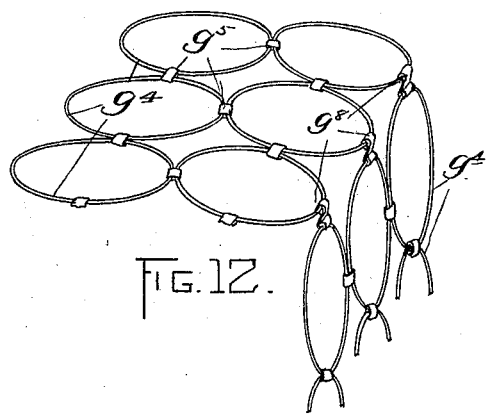
Figure 13:
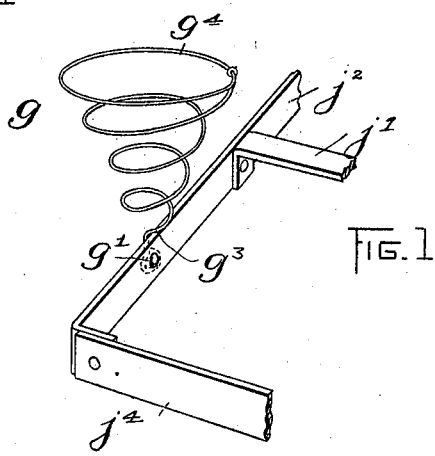
Figure 14:
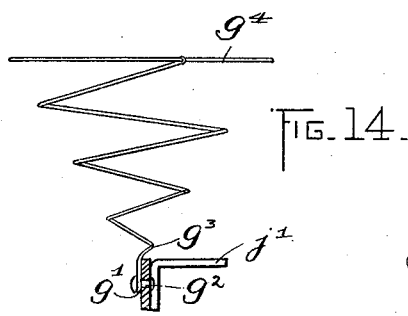

Of the drawings, Figure 1 represents in plan view a couch-bed embodying my invention, the side frames being shown as horizontally or laterally extended. Fig. 2 represents a side elevation of the same. Fig. 3 represents an end elevation of the couch-bed with the side frames horizontally extended. Figs. 4 and 5 represent cross-sectional views on the line 4 4 of Fig. 4, respectively, showing the side frames raised and lowered. Fig. 6 represents in detail the means for connecting one of the side frames to the main frame at points intermediate of its ends. Fig. 7 represents in detail the lever which is employed for rocking the shaft to effect the lowering of the side frames. Figs. 8 and 9 represent cross-sectional views of another form of couch-bed embodying my invention, the side frames being shown as raised and lowered, respectively, in said figures. Fig. 10 represents in plan view the central or main frame. Fig. 11 illustrates in perspective view the means for joining the upper portions or coils of the springs which are mounted upon the side frames with the springs which are mounted upon the main frame. Fig. 12 is a similar view showing the springs in the positions they assume when one of the side frames is allowed to hang vertically. Figs. 13 and 14 are perspective views illustrating the manner of securing the lower ends of the spiral springs upon the bars of the frame.

Referring to the drawings, the end standards are indicated by $a$ $a$, respectively, and are mounted upon casters or rollers $a'$ $a'$. They may be as ornate as desired or else they may be perfectly plain, so as to reduce the weight thereof, and they are preferably cast to possess sufficient strength to withstand any weight or pressure that may be put upon the bed.

Secured between the end standards is the main mattress-supporting frame, which, as shown in Fig. 1, consists of end bars $b$ $b$, arranged parallel to the end standards and secured thereto at their extremities by bolts $b'$ $b'$ passing into lugs or bosses projecting inwardly from the said end bars. Between these end bars extend longitudinal outer bars or strips $b^2$ $b^2$ and inner longitudinal strips $b^3$ $b^3$. These strips, together with the end bars, constitute the main frame, and they are all formed of strap-iron with their faces vertical, so that their edges extend upwardly and downwardly.

The swinging side frames comprise end bars $c$, fulcrumed upon the bolts $b'$ $b'$ and connected by the longitudinally-arranged bars $c'$ $c^2$, which are likewise formed of strips. These last-mentioned bars $c'$ $c^2$, as well as the bars $b^2$ $b^3$ of the main frame, are connected and braced by cross-bars $c^3$ and $b^4$, respectively, which are arranged horizontally with their ends turned downwardly, as shown in Fig. 6, and riveted to the said longitudinal bars. There may be as many of these cross-braces as desired, the number shown in the drawings being sufficient for all general purposes.

For the purpose of supporting the frames between their ends there is another standard $d$, upon which the longitudinal frame-bars $b^2$ $b^3$ rest. This standard is usually light, as compared to the others, and is not ornamented. Upon the central cross-braces $c^3$ of each of the side frames is secured a bar $c^4$, which is pivoted at $c^5$ to a slide or bar $c^6$, sliding in a guide $b^5$, secured upon the central cross-brace $b^4$ of the main frame. The upper portion of the guide $b^5$ is slotted, as at $b^6$, and the slide $c^6$ is provided with a pin $c^7$, which projects upwardly through the slot, which limits the movement thereof. When the side frames are elevated, as shown in Fig. 4, the slides are drawn outward, so that the pins $c^7$ press against the ends of the slots; but when the side frames are dropped, as shown in Fig. 5, the slides are thrust inwardly and support them at the center. In this connection it will be observed that the projecting ends of the end bars $b$ $b$ are bent upwardly, as at $b^7$, and that the ends of the bars $c$ $c$ are likewise bent up, as at $c^8$, so that the pivots $b'$ are above the plane of the main frame for a purpose to be afterward described.

For holding the side frames in their elevated position I employ pairs of toggle-levers $e$ $e'$, each pair pivoted together at $e^2$. There are three pairs of toggle-levers on each side of the main frame, and they are arranged two at each end of the bed and two near the center thereof, the lower ends of the toggle-levers $e$ being pivoted at $e^3$ to the standards. The lever $e'$ of each pair is rigidly secured by rivets to an arm $f'$, likewise rigidly secured to a rock-shaft $f$, journaled in bearings $f^2$ $f^2$, secured to the end bars $c$ $c$ of the side frames. On each frame the shaft lies between the longitudinally-extended strips, so as to be in the plane thereof, and therefore out of sight. The arm $f'$ of each of the central pair of levers is provided with a finger or lever $f^3$, projecting at an angle thereto, as shown in Figs. 4 and 6, so as to be easily grasped by the hand, and rocking the finger $f^3$ downwardly and inwardly the shaft $f$ may be rocked sufficiently to throw the toggle-lever inwardly and allow the side frames to drop.

The standards are provided with stops, (indicated at $a^2$ $a^2$ and $d'$, respectively,) and they are so placed relatively to the pivots $e^3$ of the toggle-levers that when the main frames are elevated the toggle-levers may be rocked outward far enough to rest upon them. In this event the pivot $e^2$ is outside of the line connecting the shaft $f$ and the pivot $e$, (shown by the dotted line 6 in Fig. 4,) so that the toggle-levers are at an angle to each other. Hence when it is desired to convert the bed into a couch the finger $f^3$ is thrust inward, so as to raise the levers and carry the pivot $e^2$ to the other side of the line connecting the shaft with the pivot $e^3$, whereupon the side frames will drop by their own weight. It is not necessary, however, to always employ the finger or lever $f^3$, for by raising each side frame with a quick movement the pivot $e^2$ of the toggle-levers will be swung with a jerk past the said line connecting the said pivot $e^3$ and the said shaft and the side frames will drop.

When the side frames are lowered, the toggle-levers assume the position shown in Fig. 5; but when they are raised the said levers rest upon the stops $a^2$ and $d'$, as illustrated in Figs. 3 and 4.

Upon the frame, composed of the main frame and the swinging side frame, is secured the wire mattress, which consists of the inverted coiled springs $g$. The lower end of each spring is formed into an eye $g'$, as shown in Figs. 13 and 14, and is secured to one of the longitudinally-arranged bars $b^2$, $b^3$, or $c^2$ by means of a rivet $g^2$. The first bend $g^3$ of the spring extends across the upper edge of the bar, as shown in the said last-mentioned figures, so that in case a heavy weight is sustained by the springs the pressure comes upon the said longitudinally-disposed bars and is not maintained by the rivets. The upper flat coils $g^4$ of the springs are connected together by links $g^5$ $g^5$, the springs which are mounted upon the main frame being surrounded by a band $h$, to which they are secured by links $g^6$, and the springs in each side frame being secured to the surrounding band $h'$ by links $g^7$, and by examining Fig. 1 it will be seen that the quadrangular bands $h$ $h'$ are hinged together by links $h^2$ $h^2$. Therefore when the side frames are lowered the bands $h'$ swing down relatively to the band $h$. Upon the top of the springs is placed a continuous cushion or mattress $i$, formed of hair or any desirable material and covered with a ticking of suitable fabric, there being a flap $i'$ extending from the longitudinal edges of the mattress or cushion to the outer bars $c'$ of the side frames.

In Figs. 8 to 12 I have illustrated another embodiment of the invention, in which the side frames are locked in their vertical position as well as in their horizontal position, and in which I dispense with the employment of the quadrangular bands and connect all of the springs directly together. In this form of the invention the main frame comprises the two intermediate hinged bars $j$ $j$, connected together by the cross-brace $j'$ $j'$ and the outer bars $j^2$, formed of a single length or strap, which having it ends secured together at $j^3$ forms also the end bars $j^4$ $j^4$, to which the ends of the bars $j$ $j$ are secured, as at $j^5$. The end bars of the swinging side frames are formed as illustrated in Fig. 6 and are pivoted at $b'$ directly to the bosses extending inwardly from the end standards. The middle or central standard $d$ is provided with catches $d^2$ $d^2$, with which the ends of latches $k$ $k$, pivoted upon the swinging side frames, may engage. The said catches are pivoted at $k'$ $k'$ and are provided with curved fingers $k^2$ $k^2$, connected by springs $k^3$ with the outer bars $c$ of the side frames, so that when the said side frames are allowed to drop the springs will cause the latches to engage the catches $d^2$ and hold the said side frames from swinging out laterally until the catches are disengaged. For the purpose of disengaging the latches they are connected by chains $k^4$ with rods $k^5$, extending through eyes (not shown) on the outer edges of the mattress and having curved outer ends $k^6$, whereby they may be grasped by the fingers.

When it is desired to raise the side frames and convert the couch into a bed, the bent ends of the rods $k^5$ are grasped, and by drawing outwardly and upwardly the latches are disengaged and the side frames are raised. Generally it is necessary only to grasp the edge of the spring-mattress and draw it upwardly to disengage the latches. The finger for rocking the shaft $f$ is curved, as shown at $f^8$, and is provided with a flattened end $f^9$, which may be easily pressed downward by the hand or foot. The springs which are secured upon the side frames are connected to the springs which are secured to the main frame by elongated links $g^8$ $g^8$, so that when the frames are raised into horizontal position the upper coils of the springs on one of the frames overlap the upper coils of the springs on the adjacent frame, as shown in Fig. 11, and when the side frames are dropped into vertical position the links allow the said coils to separate slightly, as shown in Fig 12.

In both the embodiments of the invention I employ braces $l$ $l$, extending from the standards to the cross-braces of the main frame, as shown more particularly in Figs. 1, 2, 8, and 9.

From the foregoing it will be observed that the frames may be constructed of light strips of metal, which by reason of their being arranged with their faces vertical or edgewise are capable of withstanding a comparatively great pressure and are very strong.

The coiled springs are secured directly to the longitudinal bars of the frames, and being connected together either through the medium of the bands and links in Fig. 1 or through the medium of the links $g^8$, as in Fig. 12, furnish a continuous flat surface to receive the mattress $i$, which is placed thereon.

Referring again to the end bars of the side frames, which have hereinbefore been described as being upturned, as at $c^8$, it will be observed that the pivots are thus adjacent the line of the hinges which connect the mattress-sections together. In this way the pivotal lines of the mattress-sections are substantially coincident with the pivotal lines of the main and side frames, the purpose of this being to permit the springs of the side frames to lie at substantially a right angle to the adjacent springs of the main frame when the said side frame is lowered, as shown in Fig. 9. Moreover, by bending up the end bars of the side frames and pivoting them to the end standards above the plane of the main frame the said side frames may be swung down vertically, so as to lie under the edges of the said main frame, as portrayed in the last-mentioned figure, and therefore occupy the smallest possible space laterally. The intermediate standard $d$ is cut away and is relatively narrow, so as to permit the said side frames to lie under or beneath the edges of the main frame, but is extended laterally at its lower end to provide stops for the levers $e$, as before referred to. The upper edges of the end standards are below the surface of the spring-mattress, and hence when the hair mattress $i$ is placed thereon one may sit upon the end of the bed without coming in contact with the said standards, a feature that is very desirable, as will be readily appreciated.

Another feature of the invention to which I call attention is that the side frames are supported along their outer edges not only at the ends thereof, but at points intermediate of the ends, by levers $e$ $e'$. They are further supported on the inner edges at the ends thereof by the pivots $b'$ and the end standards, and they are supported intermediate of their ends by the slides which work in guides supported by the main frame and intermediate standard. The slides reciprocate transversely of the bed and are in substantially the plane of the main frame and below the plane of the upper edges of the end standards. By this arrangement the side frame is supported on its inner edge at the center to prevent it from collapsing by means which do not project above the main frame, whereby the mattress will not come in contact therewith even though a person be sitting upon the edge of the couch when the said side frames are lowered, as shown in Fig. 9.

Another important feature of the invention is the intermediate standard. As before shown, the main and side frames are formed of thin strips of metal placed edgewise and suitably braced and connected; but I have found that unless they are supported intermediate of their ends they must either be very heavy or else they will collapse. Hence not only the side frames are supported by the slides, but the slides and the main frame itself are supported by an intermediate standard.

The whole couch-bed is light and may be moved from place to place, is easily constructed, requiring but few cast parts, and is handsome in appearance.

Having thus explained the nature of the invention and described a way of constructing and using the same, though without attempting to set forth all of the forms in which it may be made or all of the modes of its use, it is declared that what is claimed is—

1. A couch comprising standards or supports, a main frame, a side frame hinged levers pivoted to the standards and to the said side frame for supporting the side frame when it is elevated, and a stop for engaging and holding said levers in their operative and frame-sustaining positions at an angle to each other, whereby the frame is sustained only by the levers and the standards.

2. A couch-bed comprising standards or supports, a main frame, a swinging side frame, two levers pivoted together at their meeting ends and pivoted at their outer ends to one of the standards and to the side frame, and a stop on the standard against which one of the levers may rest to sustain the side frame in a horizontal position.

3. A couch-bed comprising standards or supports a main frame, a swinging side frame, two levers pivoted together at their meeting ends, and pivoted at their outer ends to one of the standards and to the side frame, said levers projecting normally toward the median line of the main frame when the levers are inoperative and outward therefrom when they are sustaining the side frame, and a stop carried by the last said standard against which one of the levers rests when they are in their operative side-frame-sustaining position.

4. A couch-bed comprising two standards or supports, a main frame, a swinging side frame, two pairs of pivoted levers pivoted to the side frame and to the standards, stops on the standards on which said levers may rest, and a rock-shaft for simultaneously throwing said levers into their inoperative positions.

5. A couch-bed, comprising end standards, a main frame supported by said standards, a swinging side frame, toggle-levers at each end of the side frame for supporting it and a rock-shaft positively connected to both sets of toggle-levers for throwing them into inoperative position to permit the side frame to drop.

6. A couch-bed comprising standards, a main frame a swinging side frame, means for supporting the side frame in a raised position, a latch on the side frame for engaging a catch on one of the standards and thereby locking the said side frame in a lowered position, and a mattress connected to the latch for operating it to release the catch.

7. A couch-bed comprising end standards, and an intermediate standard, a main frame supported on said standard, a swinging side frame having end bars pivoted to the end standards, a support for the central part of the side frame consisting of a slide, and a guide supported by the standards and main frame for the said slide.

8. A couch-bed comprising a main frame, a swinging side frame, each of said frames having its side and end bars formed of metallic bands or straps placed edgewise with strips or bands connecting them, end standards to which said side frame is pivoted, an intermediate standard, and means connecting said side frame with said intermediate standard whereby the side frame is supported at and between its ends, by the said standards only.

9. A couch-bed comprising a main frame, a swinging side frame, end standards, means for supporting the side frame along its outer edge at its ends and at a point intermediate of its ends, and means for supporting the said side frame along its inner edge at its ends and at a point intermediate of its ends, both said means being supported by the said standards.

10. A couch-bed, comprising end standards, an intermediate standard, a main frame, a swinging side frame pivoted to said end standards, an intermediate means for supporting the side frame along its outer edge at the ends and at a point intermediate of the ends, and a slide supported upon said intermediate standard, and connected to the inner edge of the said side frame between the ends thereof, whereby said side frame is supported along both edges between its ends.

11. A couch-bed comprising a main frame, a swinging side frame, and a coiled-spring mattress connected to the main and side frame, and having the top coils of the springs at all times remote from the said frames to keep a user of the couch-bed out of contact with the said frames.

12. A couch-bed comprising a main frame, end standards projecting above the plane of the main frame and a side frame having upwardly-turned end bars pivoted at their ends to said standards above the plane of the main frame.

13. A couch-bed comprising a main frame, end standards projecting above and laterally beyond the main frame a swinging side frame supported by said standards only and arranged to hang vertically under the edge of the main frame, and an intermediate standard for supporting the main frame and the side frame.

14. A couch-bed comprising a main frame, end standards projecting above and laterally beyond the main frame, a swinging side frame having upturned end bars pivoted to the main frame, and arranged to lie vertically under the edge of the main frame, an intermediate standard under the main frame, and means for supporting the outer edge of said side frame upon the said standards.

15. A couch-bed comprising a main frame, a swinging side frame, said frames having side bars, and a mattress formed of a series of coiled springs connected at their lower ends to the said frames, said springs having their top coils at all times remote from the side bars of the said frames.

16. A couch-bed comprising a main frame, a swinging side frame, a stuffed mattress, and a spring-mattress interposed between the stuffed mattress and the said frames, said spring-mattress consisting of coiled springs, only, having their lower ends connected to the said frames, and their upper coils remote at all times from the said frames and connected directly together.

17. A bed comprising a mattress-supporting frame formed in two parts, one of which can swing relatively to the other, each part being constructed of strips of metal suitably connected and arranged with their faces at a right angle to the plane of the bed, and a mattress secured to said parts of said frame and consisting of coiled springs having their lower ends rigidly secured to said metallic strips, and links connecting the top coil of each spring to the top coils of the adjacent springs.

18. A bed comprising a mattress-supporting frame formed in two parts, one of which can swing relatively to the other, each part being constructed of strips of metal suitably connected and arranged with their faces at a right angle to the plane of the bed, and a mattress secured to said parts of said frame and consisting of coiled springs having their lower ends rigidly secured to said metallic strips, and links connecting the top coil of each spring with the top coils of all the adjacent springs.

19. A couch-bed comprising a main frame and a swinging side frame, each constructed of longitudinally-arranged metallic strips with their faces parallel and suitably connected, in combination with a mattress formed in two sections, each section comprising a series of spiral springs having their top coils connected together and their lower ends rigidly secured to said strips, said sections being connected by elongated links.

20. A couch-bed comprising a mattress formed of spiral springs having their top coils connected together, end standards, a main frame, and a swinging side frame, said frames having connected thereto the lower ends of said springs, and the said side frame being pivoted to the end standards above the plane of the main frame, and adjacent the plane of the tops of the springs.

21. A couch-bed comprising a mattress constructed in two sections, each section being formed of spiral springs, having their top coils connected together, a main frame, end standards, and a swinging side frame, said springs forming said mattress-sections being secured at their lower ends to said frames respectively, and having their top coils always remote from the said frames and said side frame being pivoted to said end standards in a line adjacent the line of division of said mattress-sections.

In testimony whereof I have signed my name to this specification, in the presence of two subscribing witnesses, this 11th day of September, A. D. 1897.

EUGENE R. LEIGHTON.

Witnesses:
C. C. STECHER,
A. D. HARRISON.